United States Patent [19]
Iki et al.

[11] Patent Number: 5,379,105
[45] Date of Patent: Jan. 3, 1995

[54] ROOF SURFACE MEASURING APPARATUS

[75] Inventors: Makoto Iki; Hirofumi Matsuo; Masahiro Oono; Masato Noguchi, all of Tokyo, Japan

[73] Assignee: Asahi Kogaku Kogyo Kabushiki Kaisha, Tokyo, Japan

[21] Appl. No.: 964,959

[22] Filed: Oct. 22, 1992

[30] Foreign Application Priority Data

Oct. 24, 1991 [JP] Japan ................................. 3-339270
Oct. 31, 1991 [JP] Japan ................................. 3-349295
Oct. 31, 1991 [JP] Japan ................................. 3-349296
Oct. 31, 1991 [JP] Japan ................................. 3-349297

[51] Int. Cl.⁶ .......................................... G01B 11/00
[52] U.S. Cl. ................................. 356/359; 356/353
[58] Field of Search ............... 356/345, 360, 359, 353, 356/351

[56] References Cited

U.S. PATENT DOCUMENTS 4,762,417 8/1988 Wu et al. ........................... 356/351
5,218,425 6/1993 Oono ................................. 356/359

OTHER PUBLICATIONS

D. Sen and P. N. Puntam Bekar, "Shearing Interferometers for Testing Corner Cubes and Right Angle Prisms," Jun. 1966.

N. P. Barton, "Measurement of Roof and Other Prisms," Apr. 1979.

Yu, D. Berezin, V. V. Lyubimov and L. N. Soms, "The Measurement of Prism Fabrication Errors by an Interference Method," Nov. 1976.

Primary Examiner—Samuel A. Turner
Assistant Examiner—Peter J. Rashid
Attorney, Agent, or Firm—Sughrue, Mion, Zinn, Macpeak & Seas

[57] ABSTRACT

An interferometer causes a reference beam and a subject beam reflected from a roof surface to interfere with each other to form an interference fringe, which is detected by an image detecting element in its measuring area. Detection data from the image detecting element is processed by an image processing circuit, and then subjected to phase difference detection. A continuous function is determined as an approximation to a relationship between phase data and unit measuring areas located in a direction perpendicular to a line corresponding to a ridge line of the roof surface. A analysis relating to a roof angle is performed based on the continuous function thus determined.

17 Claims, 9 Drawing Sheets

ROOF SURFACE MEASURING APPARATUS

BACKGROUND OF THE INVENTION

This application is based on and claims priorities from Japanese Patent Application Nos. Hei. 3-339270 filed Oct. 24, 1991, Hei. 3-349295 filed Oct. 31, 1992, Hei. 3-349296 filed Oct. 31, 1991 and Hei. 3-349297 filed Oct. 31, 1991, the disclosures of which are incorporated by reference herein.

The present invention relates to a roof surface measuring apparatus for measuring the accuracy of a roof surface of a rectangular prism and a roof surface formed by joining surfaces of two mirrors, etc. substantially perpendicularly (roof surfaces for optical parts etc.).

In the finder system of some types of recent lightweight single-lens reflex cameras, a penta mirror, which is a combination of mirrors, is used instead of a penta prism. A roof mirror constitutes Dart of such a penta mirror.

Requirements for a highly accurate penta mirror include that the ridge line of the roof mirror not have a width, and that an angle formed by the two mirror surfaces be precisely 90°. Conventionally, in the case of roof prisms, such as a penta prism, that are produced by polishing a glass material, the flatness of the roof surface is assured in a wide area. Therefore, the angle of the roof surface can be approximated by measuring angles in this wide area, and the angle of the roof surface is measured with an autocollimator.

Where the roof surface is manufactured by, for instance, plastic injection molding, unevenness such as a bend and rounding may be caused in the mirror surface by local strains occurring during the molding.

By conventional measuring methods, it is difficult to measure the roof angle of roof surfaces having insufficient flatness, particularly roof surfaces having insufficient flatness in the vicinity of their ridge line.

In the case of performing measurements on the roof surface using the interferometer, the contrast of an interference fringe varies with the reflectivity that depends on the material of the roof surface itself and the medium before the roof surface. Therefore different contrasts of the interference fringe are obtained for a roof surface of a roof mirror and that of a penta prism even with the same light incident thereon.

However, since the contrast variation with the material of the roof surface is not considered in the above conventional interferometer, with certain kinds of materials of the roof surface the contrast of the interference fringe is unduly reduced to make the observation very difficult.

In the case of performing measurements on the roof surface using the interferometer or the like, it is necessary to detect the position of the ridge line precisely. This is particularly important for molded roof mirrors because the bend of the reflection surface occurs irregularly.

However, the correct detection of the ridge line position by the above conventional measuring method becomes more difficult as the roof surface is manufactured more precisely, i.e., as the ridge line becomes more like a straight line and its width approaches zero.

SUMMARY OF THE INVENTION

The present invention has been made in view of the above problems in the art and has an object of providing an apparatus which can correctly measure a roof angle and a degree of rounding of a roof surface by a single measurement.

Another object of the invention is to provide an apparatus which can measure a roof angle and a degree of rounding even where a roof surface is not correctly arranged with respect to an interferometer.

Another object of the invention is to provide an apparatus for measuring a roof angle and a degree of rounding of a roof surface in which an adjustment can be made to obtain an optimum contrast of an interference fringe in accordance with a material etc. of the roof surface.

A further object of the invention is to provide a method of precisely detecting the position of a ridge line of a roof surface in performing measurements on the roof surface.

According to the invention, a roof surface measuring apparatus comprises:

a light source for emitting a coherent light beam;

a reference surface for reflecting part of the coherent light beam to produce a reference beam;

means for making part of the coherent light beam incident on a roof surface to produce a subject beam that is reflected from the roof surface;

an interferometer for causing the reference beam and the subject beam to interfere with each other to produce an interference fringe on a detection plane, and for detecting the interference fringe;

means for detecting phase differences of the interference fringe in a predetermined measuring area of the detection plane;

means for determining a continuous approximation function representing a relationship between positions in a first direction perpendicular to a line in the measuring area corresponding to a ridge line of the roof surface and the phase differences detected along the first direction; and means for performing an analysis relating to a roof angle of the roof surface based on the approximation function.

There may be provided means for averaging the detected phase differences at symmetrical positions with respect to the line corresponding to the ridge line, in which case the determining means determines the approximation function based on the phases thus averaged.

At least one polarizer may be disposed before the detection plane so as to be rotatable about the optical axis of the interferometer to change a contrast of the interference fringe. Further, according to the invention, a roof surface measuring method comprises the steps of:

making an illumination light beam incident on a roof surface;

inserting a shield plate in a path of the illumination light beam such that a side of the shield plate intersects a ridge line of the roof surface when viewed along the path of the illumination light beam while observing an image of a light beam reflected from the roof surface; and identifying a line corresponding to the ridge line in the image being observed. This method may also further comprise the step of positioning the roof surface based on the identified line.

DESCRIPTION OF THE PREFERRED EMBODIMENTS

Embodiments of the present invention are described hereinafter with reference to the accompanying drawings.

Referring to FIGS. 1-6, a first embodiment of the invention is described.

Figure 1:
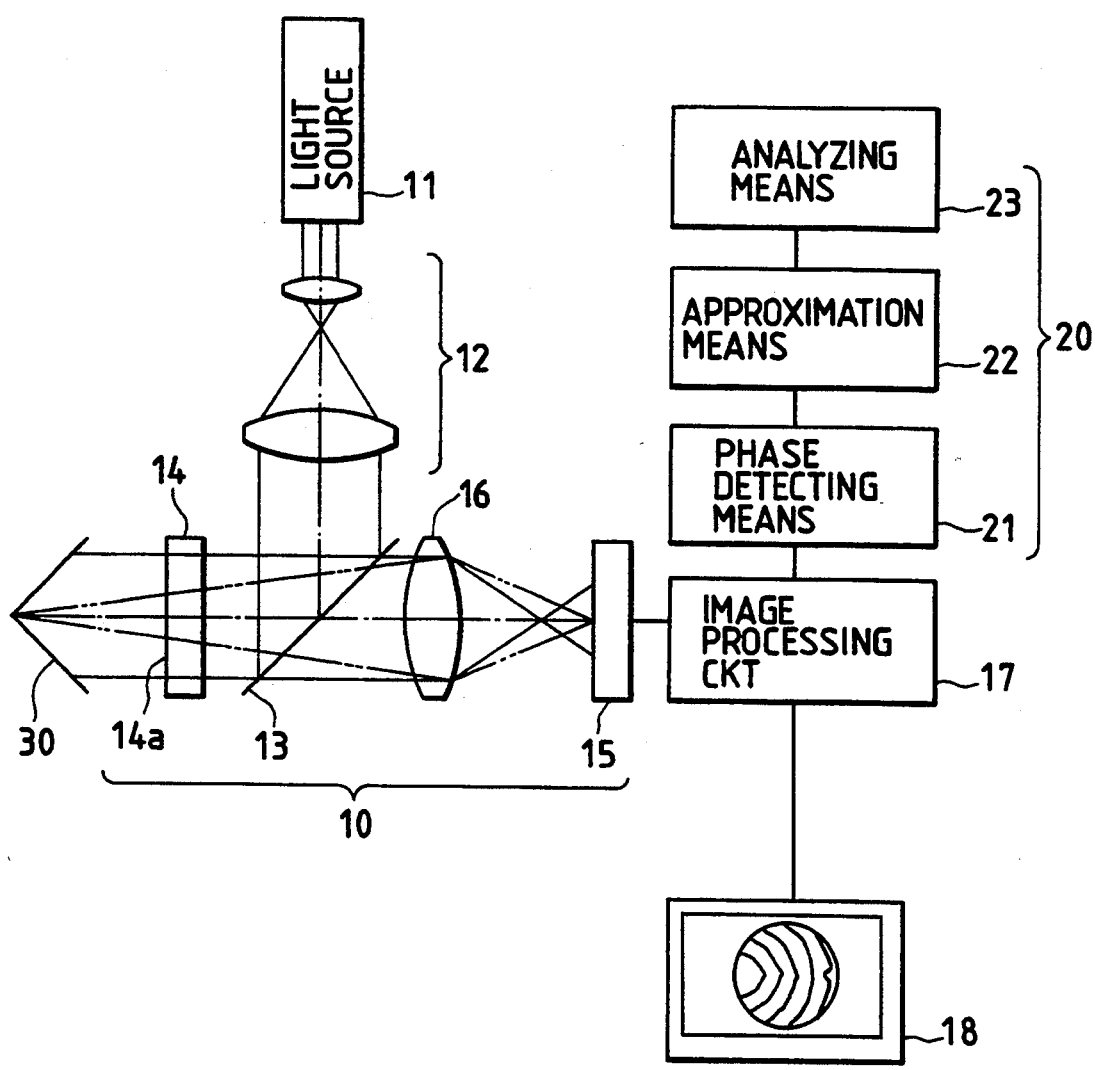
FIG. 1 is a block diagram showing a roof surface measuring apparatus according to a first embodiment of the present invention.

As shown in FIG. 1, in a roof surface measuring apparatus according to the first embodiment, an interferometer 10, e.g., a conventional Fizeau interferometer, consists of a coherent illumination light source 11, typically a He—Ne laser or a semiconductor laser, a beam expander 12, a half mirror 13, an optical member 14 having a reference surface 14a, an observation lens 16 and an image detecting element 15. A measuring means 20 consists of a phase detecting means 21, an approximation means 22 and an analyzing means 23. The rear surface measuring apparatus 10 further includes an image processing circuit 17 and an interference observing monitor 18.

The interferometer 10 is a digital interferometer capable of digitally processing the detected interference fringe. The measurement is performed based on, for instance, the known fringe-scan technique.

A parallel, coherent light beam emitted from the illumination light source 11 is expanded by the expander 12 and then reflected by the half mirror 13. Part of the light beam reflected by the half mirror 13 is reflected by the reference surface 14a, which surface 14a also serves as a reference surface, to become a reference beam. The remaining part is reflected by a roof surface 30 to become a subject beam to be measured. An interference fringe produced by the interference of these two beams passes through the observation lens 16, and detected by the image detecting element 15, where it is converted to an electrical signal representing the light and shade of the interference fringe. The ridge line (joining line) of the roof surface and the image detecting element 15 are in a conjugate relationship with respect to the observation lens 16. The interferometer 10 is not limited to the Fizeau interferometer but may be a Twyman interferometer or other types.

At the time of measurement, the optical system is arranged so that the interference fringe produced by the subject beam from the roof surface 30 and the reference beam from the reference surface 14a becomes symmetrical with respect to the line corresponding to the ridge line of the roof surface 30. More specifically, the roof mirror is positioned relative to the interferometer 10 in a plane perpendicular to the optical axis of the interferometer 10 and relative to its ridge line (rotational adjustment). Then, the roof surface 30 is arranged with respect to the interferometer 10 so that the two surfaces constituting the roof surface 30 form the same angle with the optical axis of the interferometer 10. Since by virtue of this arrangement the interference fringe appears symmetrically with respect to the line corresponding to the ridge line, it suffices to measure only the part of the interference fringe on one side of that line.

Figure 2:
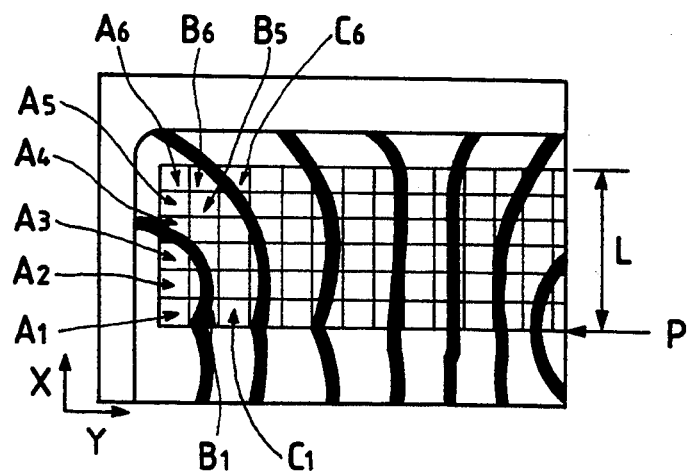
FIG. 2 shows a relationship between an interference fringe and a measuring arena on an observing monitor.

FIG. 2 shows an example of part of an interference fringe on one side of the ridge line as formed on the image detecting element 15, together with unit measuring areas (divided by a grating) of the image detecting element 15. On the observation monitor 18, the x- and y-axes are defined as a direction perpendicular to a line P corresponding to the ridge line and a direction of the line P, respectively. In FIG. 2, the unit measuring areas are given symbols A, B, C, ..., in the y-axis direction and 1, 2, 3, ..., in the x-axis direction starting from the line P.

A width L in the x-axis direction of the measuring area is set to provide an area necessary for the roof mirror evaluation, in this example at several millimeters. The reason why only a relatively narrow area adjacent to the line P is set as the measuring area is that part of the light beam reaching the vicinity of the ridge line has a large influence on the performance of the observation in which an image is observed via a penta mirror having a roof mirror.

Figure 3:
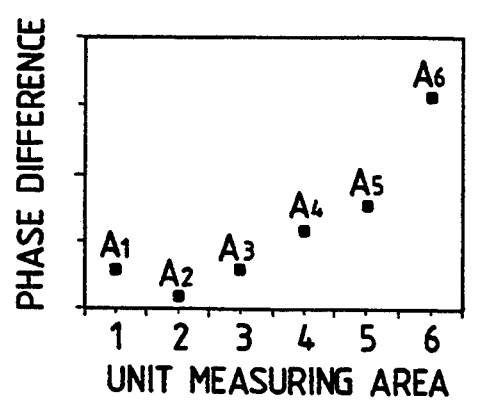
FIG. 3 is a graph showing a relationship between detected phase differences and unit measuring areas in the x-axis direction.
Figure 4:
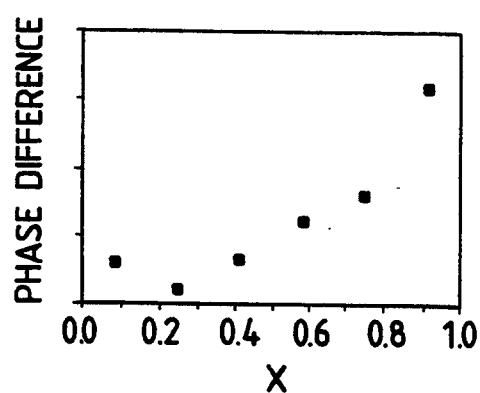
FIG. 4 is a graph corresponding to the graph of FIG. 3, in which a length L in the x-direction of the measuring area is normalized to 1.

After processed by the image processing circuit 17, data representing the light and shade of the detected interference fringe is displayed on the interference observing monitor 18, and also input to the phase detecting means 21, where phase differences (i.e., optical path differences between the reference beam and the subject beam) at respective positions on the interference wavefront in the measuring area are determined as shown in FIG. 3. FIG. 3 shows phase data of the A-column of the image detecting means 15. The phase detecting means 21 normalizes the positions in the x-axis direction by dividing those by the length L of the measuring area so that the x-coordinate of the line P corresponding to the ridge line becomes 0 and that of the end line of the measuring area becomes 1. FIG. 4 is a graph showing a relationship between the phase differences and the x-coordinates after the normalization.

Figure 5:
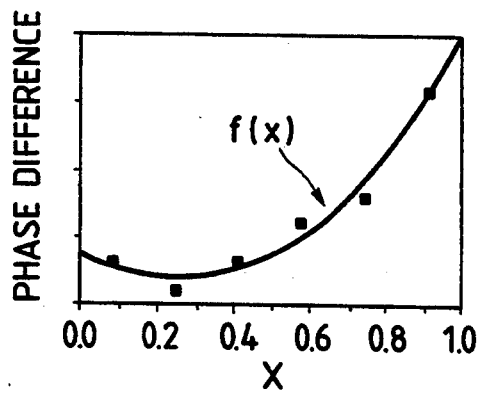
FIG. 5 is a graph corresponding to the graph of FIG. 4, in which plots are approximated by a function f(x)

Then, as shown in FIG. 5, the approximation means 22 determines a function f(x) (variable: normalized x-coordinate) representing a continuous curve as an approximation of the plots of FIG. 4. For example, the approximation is performed according to the least squares method using a polynomial of the fourth degree. The phase data corresponding to the ridge line are not used in this approximation.

The analyzing means 23 for analyzing the shape of the roof surface 30 first differentiates the function f(x) to obtain a function f'(x), and calculates an error angle T at the ridge line portion of the roof surface by substituting the coordinate x=0 of the line P into the derivative f'(x):

$$T = kf'(0)$$

where k is a constant for correcting the angle that is detected as a twofold value due to the reflection.

Further, the analyzing means 23 calculates an average S of error angles of the roof surface 30 on a single line in the x-axis direction, i.e., perpendicular to the line P. The average S is determined by measuring an angular error for every adjacent unit measuring areas and taking a total sum of the angular errors thus measured. Since the angular errors in the intermediate areas cancel out each other, the average error angle S can be calculated using only the coordinates of the line P and the end line such that:

$$S = \{kf(1) - kf(0)\}/(1-0).$$

The error angle of the roof surface 30 is obtained as S itself, and an angular deviation between the ridge line portion and the remaining portions, i.e., a bend of the surface, is obtained as T−S.

As a result of performing the above process, there are obtained data that are based on the detection by the unit measuring areas of the single column having the y-coordinate A. Data resulting from the detection by the entire measuring area are obtained by repeating the above computing process for all the columns of the unit measuring areas having y-coordinates B, C, D, . . . .

Figure 6:
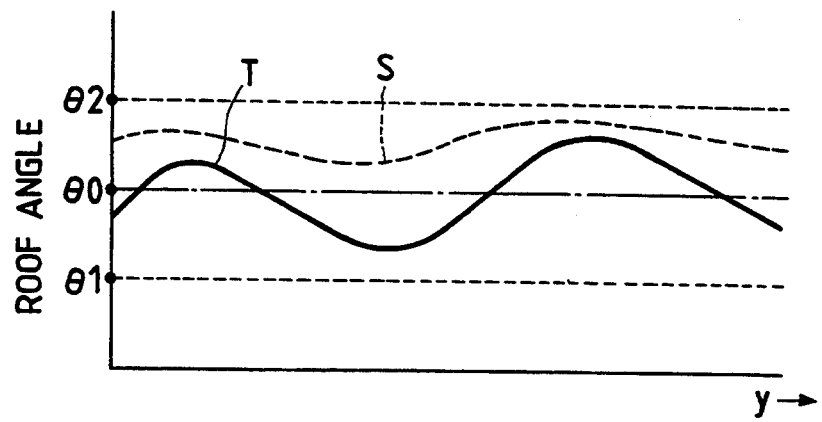
FIG. 6 is a graph showing a relationship between measured angles T and S and positions in the y-axis direction, i.e., in the direction of a ridge line.

FIG. 6 shows an example of measured error angles T and S over the entire measuring area, where $\Theta_0$, $\Theta_1$ and $\Theta_2$ represent a design angle, i.e., 90°, a lower allowable limit angle and an upper allowable limit angle, respectively. If all the angles are within the allowable error range as in the case of the FIG. 6 example (solid line), the product is judged non-defective. If even only a part of the angles are outside the allowable range, the product is judged defective. In the case of plastic mirrors, in which the error sometimes varies irregularly in the measuring area in the manner as shown in FIG. 6, the judgement should be performed over he entire measuring area.

The deformation of the roof surface with a lapse of time can be examined by performing the above process a plurality of times certain periods after the manufacture to detect variations of S and T independently.

As described above, according to the first embodiment, since the roof angle and the degree of rounding of the roof surface can be measured clearly separately, the obtained data can easily be fed back to the manufacturing process. By performing quantitative measurements, the invention can improve the quality of products utilizing the roof surface, such as a finder.

Referring to FIGS. 7–11, a second embodiment of the invention is described.

Figure 7:
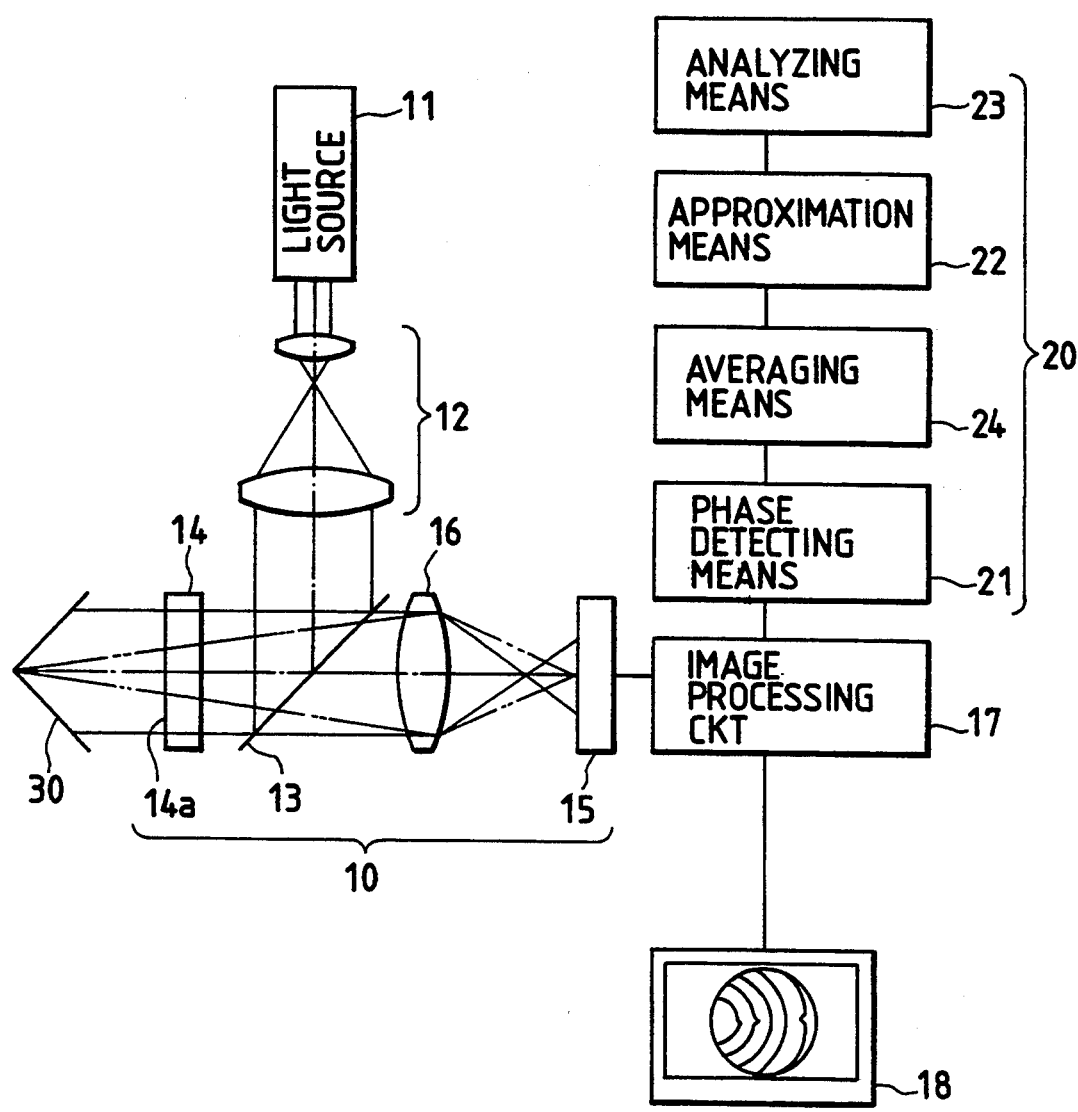
FIG. 7 is a block diagram showing a roof surface measuring apparatus according to a second embodiment of the invention.

As shown in FIG. 7, a roof surface measuring apparatus according to the second embodiment has basically the same construction as the first embodiment except that an averaging means 24 is provided between the phase detecting means 21 and the analyzing means 23.

After processed by the image processing circuit 17, data representing the light and shade of the detected interference fringe is displayed on the interference observing monitor 18, and also input to the phase detecting means 21, where phase difference at respective positions on the interference wavefront in the measuring area are determined.

At the time of measurement, the optical system is roughly arranged so that the interference fringe produced by the subject beam from the roof surface 30 and the reference beam from the reference surface 14a becomes approximately symmetrical with respect to the line corresponding to the ridge line of the roof surface 30. More specifically, the roof surface 30 is positioned relative to the interferometer 10 in a plane perpendicular to the optical axis of the interferometer 10 and relative to its ridge line (rotational adjustment).

Figure 8:
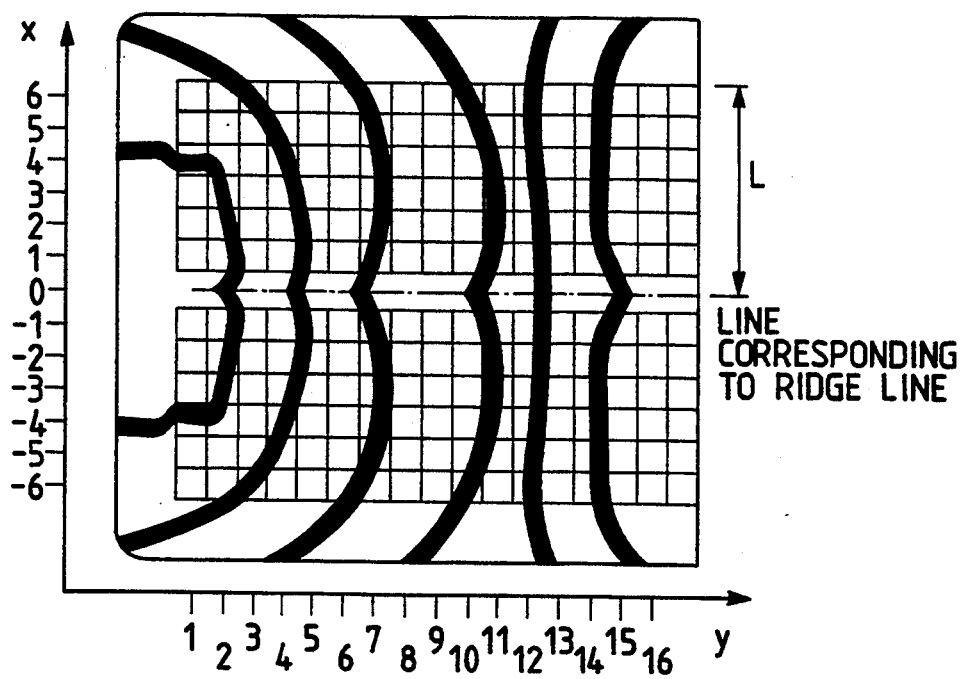
FIG. 8 shows a relationship between an interference fringe and a measuring area on an observing monitor.

FIG. 8 shows an example of an interference fringe as formed on the image detecting element 15, together with unit measuring areas (divided by a grating) of the image detecting element 15. On the observation monitor 18, the x- and y-axes are defined as a direction perpendicular to the line corresponding to the ridge line and a direction of that line, respectively. The unit measuring areas of the image detecting means 15 are represented by 1, 2, 3, . . . , upward from the line corresponding to the ridge line and −1, −2, −3, . . . , downward from the same line in the x-axis direction and 1, 2, 3, . . . , rightward in the y-axis direction (two-dimensional coordinates).

A width L in the z-axis direction of the measuring area is set to provide an area necessary for the roof mirror evaluation, in this example at several millimeters. The reason why only a relatively narrow area adjacent to the line corresponding to the ridge line is set as the measuring area is that part of the light beam reaching the vicinity of the ridge line has a large influence on the performance of the observation in which an image is observed via a penta mirror having a roof mirror.

The data of the interference fringe produced by the image detecting element 15 and processed by the image processing circuit 17 are subjected to the phase difference detection that is performed for unit measuring areas of every y-coordinate of the image detecting element 15. Graphs of FIGS. 9(a) and 9(b) show phase data detected in the unit measuring areas of y=1, i.e., 12 unit areas of (x, y)=(−6, 1) through (6, 1).

Figure 9A:
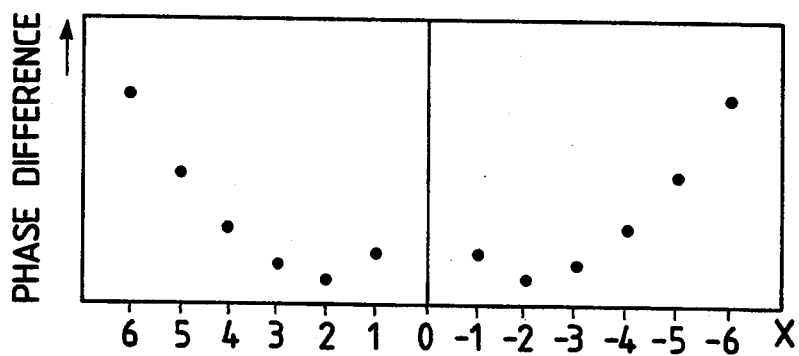
FIGS. 9(a) and 9(b) are graphs showing a relationship between detected phase differences and unit measuring areas in the x-axis direction.
Figure 9B:
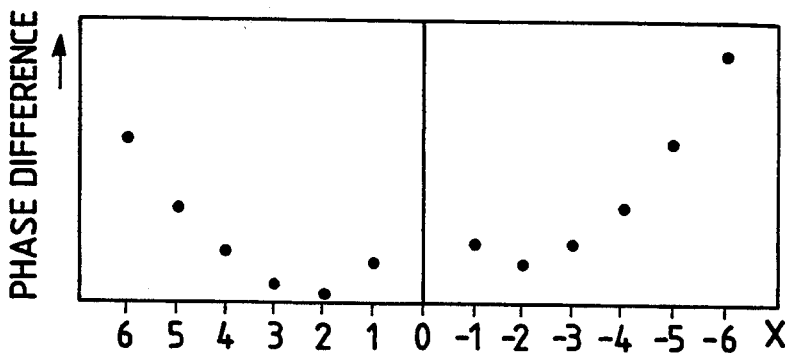

If the reference surface 14a is not inclined in the paper surface of FIG. 7 from its regular orientation in which it is perpendicular to the light beam, and if the roof mirror is mounted on the interferometer 10 so that the two surfaces constituting the roof surface 30 of the roof mirror form the same angle with the optical axis of the interferometer 10, the detected phase differences of the interference fringe, which is produced by the subject beam from the roof surface 30 and the reference beam from the reference beam 14a, become symmetrical with respect to the line (x=0) corresponding to the ridge line as in the case of FIG. 9(a). If the reference surface 14a or roof surface 30 is inclined in the paper surface of FIG. 7, the detected phase differences become unsymmetrical with respect to the line corresponding to the ridge line because tilt components due to the angular arrangement error are included therein.

The averaging means 24 adds the two phase data that are located at the symmetrical positions with respect to the line corresponding to the ridge line and calculates an average thereof. Since the two tilt components that are located at the symmetrical positions with respect to the line have the same absolute value and opposite polarities, they can be eliminated by this operation. As a result, it becomes possible to detect the angle of the roof surface 30 even if the roof surface 30 or reference surface 14a is inclined from their regular orientations.

Figure 10:
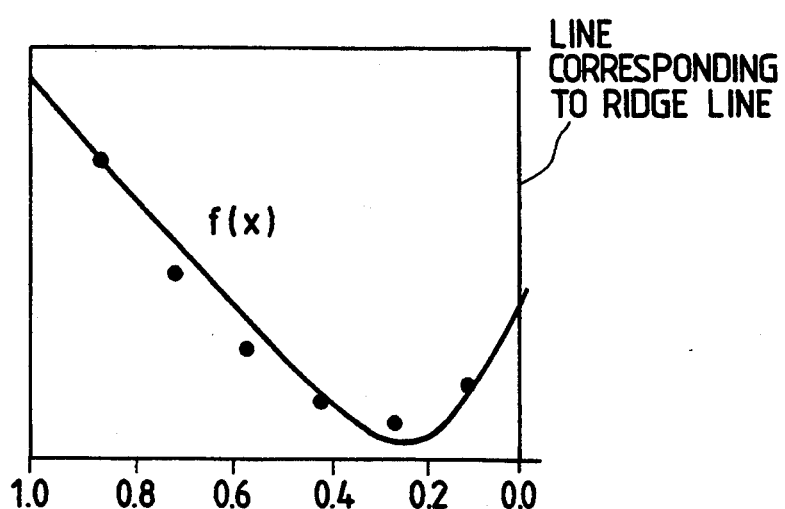
FIG. 10 is a graph corresponding to the graph of FIG. (a) or 9(b), in which plots are approximated by a function f(x)

The averaged phase data are approximated by the approximation means 22 using a function. More specifically, the averaging means 22 normalizes the positions in the x-axis direction by dividing these by the length L of the measuring area so that the measuring coordinates x of the line corresponding to the ridge line and the end line of the measuring area become 0 and 1, respectively, and approximates the plots using a continuous function f(x) having the normalized x coordinates as a variable as shown in FIG. 10. For example, the plots are approximated by the least squares method using a polynomial of the fourth degree. The phase data corresponding to the ridge line are not used in this approximation.

The analyzing means 23 for analyzing the shape of the roof surface 30 first differentiates the function f(x) to obtain a function f'(x), and calculates an error angle T at the ridge line portion of the roof surface by substituting the coordinate x=0 of the line corresponding to the ridge line into the derivative f'(x):

$$T = kf'(0)$$

where k is a constant for correcting the angle that is detected as a twofold value due to the reflection.

Further, the analyzing means 23 calculates an average S of error angles of the roof surface 30 on a single line in the x-axis direction, i.e., perpendicular to the line corresponding to the ridge line. The average S is determined by measuring an angular error for every adjacent unit measuring areas and taking a total sum of the angular errors thus measured. Since the angular errors in the intermediate areas cancel out each other, the average error angle S can be calculated using only the coordinates of the line corresponding to the ridge line and the end line such that:

$$S = \{kf(1) - kf(0)\}/(1-0).$$

The error angle of the roof surface 30 is obtained as S itself, and an angular deviation between the ridge line portion and the remaining portions, i.e., a bend of the surface, is obtained as T−S.

As a result of performing the above process, there are obtained data that are based on the detection by the unit measuring areas of the single column having the y-coordinate 1. Data resulting from the detection by the entire measuring area are obtained by repeating the above computing process for all the columns of the unit measuring areas having different y-coordinates.

Figure 11:
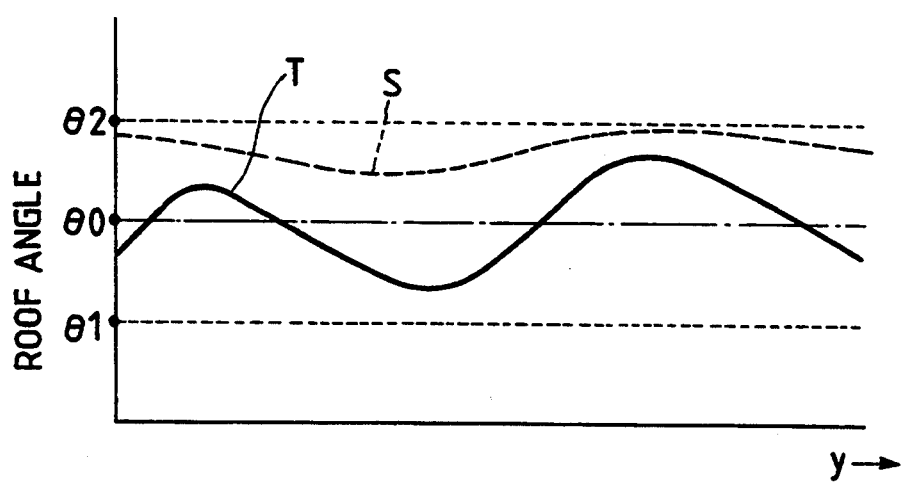
FIG. 11 is a graph showing a relationship between measured angles T and S and positions in the y-axis direction, i.e., in the direction of a ridge line.

FIG. 11 shows an example of measured error angles T and S over the entire measuring area, where $\Theta_0$, $\Theta_1$ and $\Theta_2$ represent a design angle, i.e., 90° a lower allowable limit angle and an upper allowable limit angle, respectively. If all the angles are within the allowable error range as in the case of the FIG. 11 example (solid line), the product is judged non-defective. If even only a part of the angles are outside the allowable range, the product is judged defective. In the case of plastic mirrors, in which the error sometimes varies irregularly with the measuring area in the manner as shown in FIG. 11, the judgment should be performed over the entire measuring area.

The ridge line itself may be excluded from the detection. Alternatively, it may be included in the detection, and the data corresponding to the ridge line may be excluded from the analysis.

As described above, according to the second embodiment, since the roof angle and the degree of rounding of the roof surface can be measured clearly separately, the obtained data can easily be fed back to the manufacturing process. Further, since the tilt component of the interference fringe that is caused by an inaccurate arrangement can be removed by averaging the phase data of the two symmetrical positions with respect to the line corresponding to the ridge line, the ease of operations of the measurement can be improved.

Referring to FIGS. 12–16, a third embodiment of the invention is described.

Figure 12:
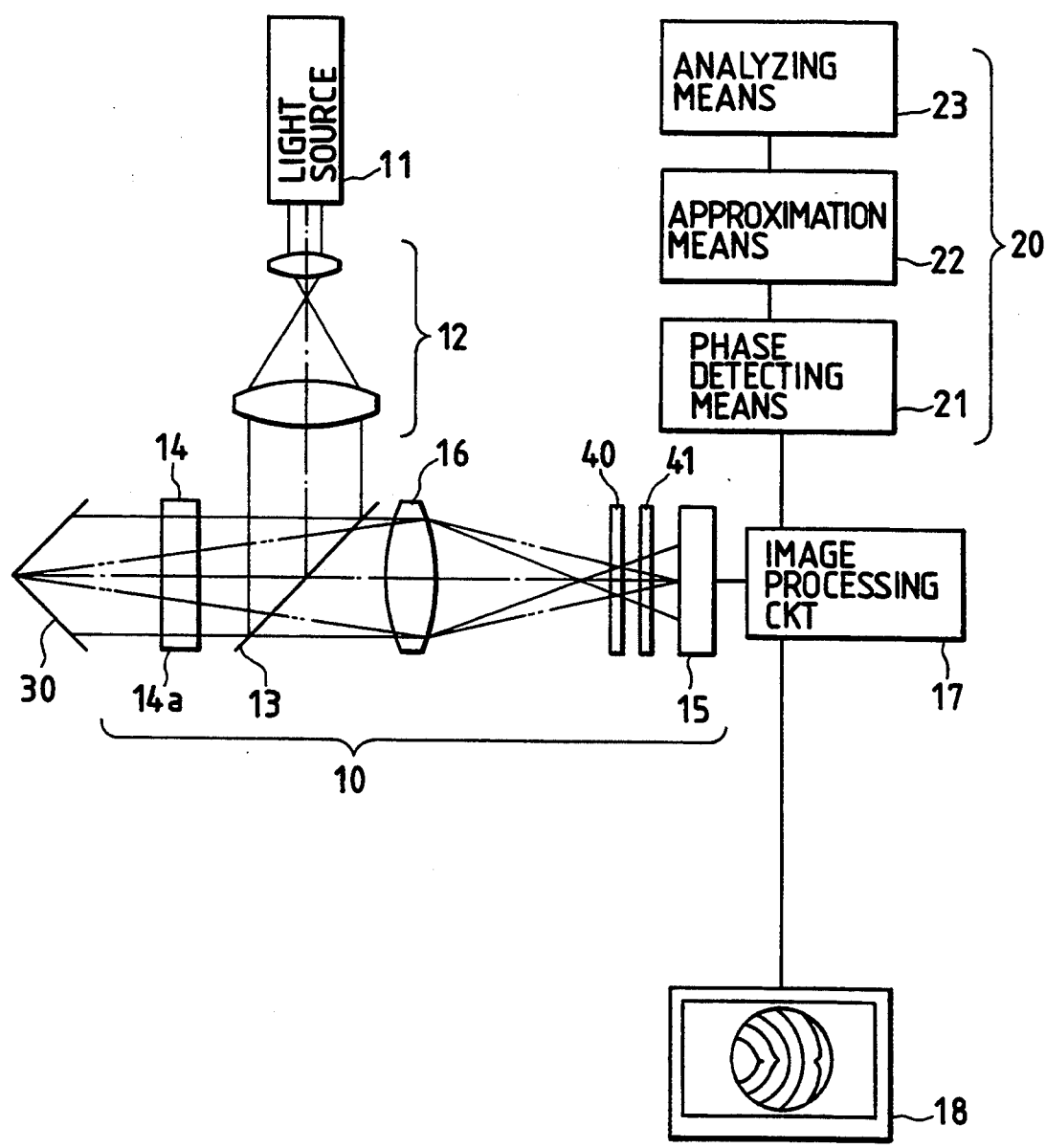
FIG. 12 is a block diagram showing a roof surface measuring apparatus according to a third embodiment of the invention.

As shown in FIG. 12, a roof surface measuring apparatus according to the third embodiment has basically the same construction as the first embodiment except that polarizing plates 40, 41 (first and second polarizing elements) are disposed between the observation lens 16 of the interferometer 10 and the image detecting element 15 so as to be rotatable about the optical axis independently.

The contrast of the interference fringe takes a maximum when the quantity of the light reflected from the reference surface 14a and that of the light reflected from the roof surface 30 are equal to each other. Since the illumination light is incident on the reference surface 14a vertically, the quantity of the light reflected therefrom does not vary. On the other hand, the quantity of the light reflected from the roof surface 30 varies with the reflectivity of the subject roof surface 30, incident angle of the incident light onto the roof surface 30, and the medium before the roof surface 30.

If it is assumed that the illumination light source 11 emits linearly polarized illumination light, such a polarization state is maintained in the reference beam. But in the case of the subject beam, the polarization state is changed because the illumination light forms a large incident angle with the roof surface 30, so that the subject beam is elliptically polarized and the polarization direction varies. Therefore, the transmittances of the respective polarizing plates 40, 41 can be changed by rotating them.

Although two polarizing plates are provided in the embodiment, one polarizing plate suffices to adjust the light quantity balance between the reference beam and the subject beam, i.e., to adjust the contrast. If two polarizing plates are provided as in the case of this embodiment, the brightness of the entire interference fringe can further be adjusted.

After processed by the image processing circuit 17, data output from the image detecting element 15 and representing the light and shade of the detected interference fringe is displayed on the interference observing monitor 18, and also input to the phase detecting means 21, where phase differences at respective unit measuring areas are detected.

At the time of measurement, the optical system is arranged so that the interference fringe produced by the subject beam from the roof surface 30 and the reference beam from the reference surface 14a becomes symmetrical with respect to the line corresponding to the ridge line of the roof surface 30. More specifically, the roof mirror is positioned relative to the interferometer 10 in a plane perpendicular to the optical axis of the interferometer 10 and relative to its ridge line (rotational adjustment). Then, the roof surface 30 is further adjusted with respect to the interferometer 10 so that the two surfaces constituting the roof surface 30 form the same angle with the optical axis of the interferometer 10. As a result, the interference fringe becomes symmetrical with respect to the line corresponding to the ridge line and, therefore, it is sufficient that only one side of the line corresponding to the ridge line of the measuring area is actually subjected to the measurement.

Figure 13:
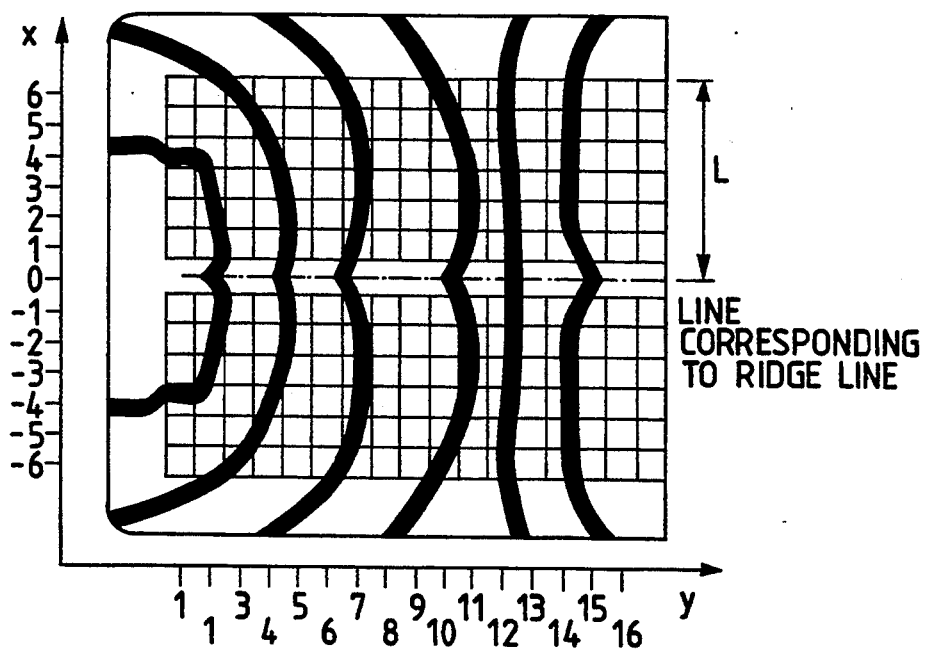
FIG. 13 shows a relationship between an interference fringe and a measuring area on an observing monitor.

FIG. 13 shows an example of an interference fringe as formed on the image detecting element 15, together with unit measuring areas (divided by a grating) of the image detecting element 15. On the observation monitor 18, the x- and y-axes are defined as a direction perpendicular to the line corresponding to the ridge line and a direction of that line, respectively. The unit measuring areas of the image detecting means 15 are represented by 1, 2, 3, ..., upward from the line corresponding to the ridge line and $-1$, $-2$, $-3$, ..., downward from the same line in the x-axis direction and 1, 2, 3, ..., rightward in the y-axis direction (two-dimensional coordinates).

A width L in the x-axis direction of the measuring area is set to provide an area necessary for the roof mirror evaluation, in this example at several millimeters. The reason why only a relatively narrow area adjacent to the line corresponding to the ridge line is set as the measuring area is that part of the light beam reaching the vicinity of the ridge line has a large influence on the performance of the observation in which an image is observed via a penta mirror having a roof mirror.

Figure 14:
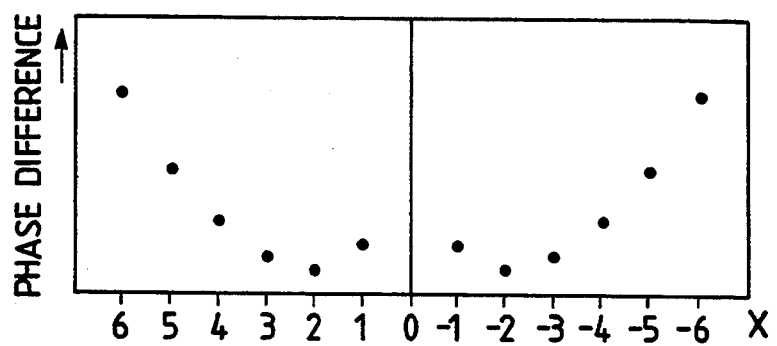
FIG. 14 is a graph showing a relationship between detected phase differences and unit measuring areas in the x-axis direction.

The data of the interference fringe produced by the image detecting element 15 and processed by the image processing circuit 17 are subjected to the phase difference detection that is performed for unit measuring areas of every y-coordinate of the image detecting element 15. A graph of FIG. 14 shows phase data detected in the unit measuring areas of $y=1$, i.e., 12 unit areas of (x, y)=(−6, 1) through (6, 1).

Figure 15:
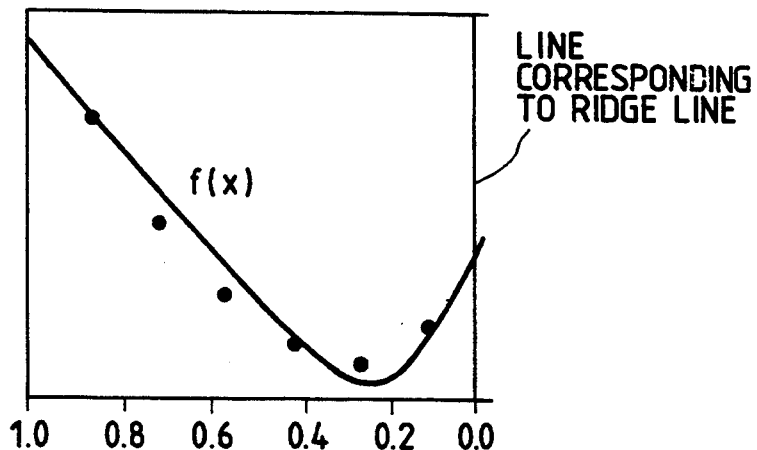
FIG. 15 is a graph corresponding to the graph of FIG. 14, in which plots are approximated by a function f(x)

The phase data on one side of the line corresponding to the ridge line in the measuring area are approximated by the approximation means 22 using a function. More specifically, the averaging means 22 normalizes the positions in the x-axis direction by dividing those by the length L of the measuring area so that the measuring coordinates x of the line corresponding to the ridge line and the end line of the measuring area become 0 and 1, respectively, and approximates the plots using a continuous function f(x) having the normalized x coordinates as a variable as shown in FIG. 15. For example, the plots are approximated by the least squares method using a polynomial of the fourth degree. The phase data corresponding to the ridge line are not used in this approximation.

The analyzing means 23 for analyzing the shape of the roof surface 30 first differentiates the function f(x) to obtain a function f'(x), and calculates an error angle T at the ridge line portion of the roof surface by substituting the coordinate $x=0$ of the line corresponding to the ridge line into the derivative f'(x):

$$T=kf'(0)$$

where k is a constant for correcting the angle that is detected as a twofold value due to the reflection.

Further, the analyzing means 23 calculates an average S of error angles of the roof surface 30 on a single line in the x-axis direction, i,e., perpendicular to the line corresponding to the ridge line. The average S is determined by measuring an angular error for every adjacent unit measuring areas and taking a total sum of the angular errors thus measured. Since the angular errors in the intermediate areas cancel out each other, the average error angle S can be calculated using only the coordinates of the line corresponding to the ridge line and thee end line such that:

$$S=\{kf(1)-kf(0)\}/(1-0).$$

The error angle of the roof surface 30 is obtained as S itself, and an angular deviation between the ridge line portion and the remaining portions, i.e., a bend of the surface, is obtained as $T-S$.

As a result of performing the above process, there are obtained data that are based on the detection by the unit measuring areas of the single column having the y-coordinate 1. Data resulting from the detection by the entire measuring area are obtained by repeating the above computing process for all the columns of the unit measuring areas having different y-coordinates.

Figure 16:
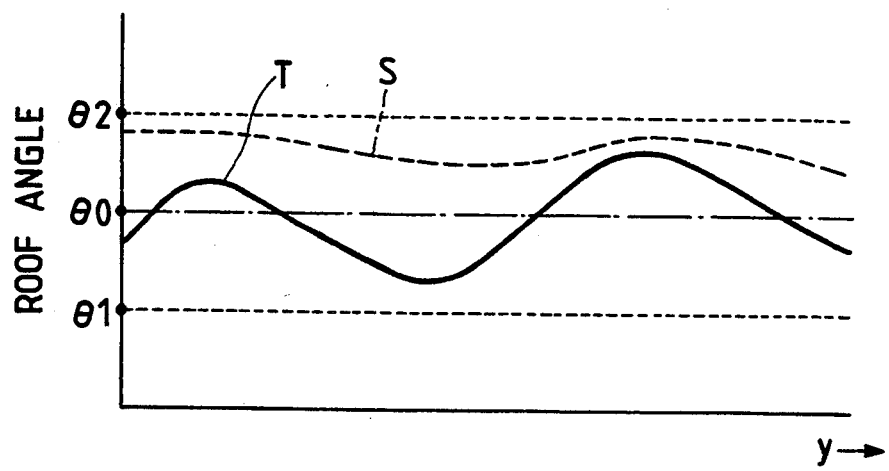
FIG. 16 is a graph showing a relationship between measured angles T and S and positions in the y-axis direction, i.e., in the direction of a ridge line.

FIG. 16 shows an example of measured error angles T and S over the entire measuring area, where $\Theta_0$, $\Theta_1$ and $\Theta_2$ represent a design angle, i.e., 90°, a lower allowable limit angle and an upper allowable limit angle, respectively. If all the angles are within the allowable error range as in the case of the FIG. 16 example (solid line), the product is judged non-defective. If even only a part of the angles are outside the allowable range, the product is judged defective. In the case of plastic mirrors, in which the error sometimes varies irregularly with the measuring area in the manner as shown in FIG. 16, the judgment should be perforated over the entire measuring area.

The reflectivities of the roof surface 30 before and after the formation of the mirror surface by evaporation are different. In either case, an interference fringe having a good contrast can be observed by properly setting the polarizing plates in the above manner. Therefore, defective and non-defective roof surfaces can be discriminated before the formation of the mirror surface by evaporation, so that vain operations can be avoided in contrast to the case of inspecting roof surface products after the evaporation.

Where the reflectivity of the roof surface after the formation of the mirror surface by evaporation is much higher than the reference surface 14a, a light attenuating means such as a ND filter may be disclosed between the roof surface 30 and the reference surface 14a.

As described above, according to the third embodiment, the adjustment can be made in accordance with the roof surface material by rotating the polarizing plates disposed before the image detecting element so that the contrast of the interference fringe becomes optimum.

Figure 18:
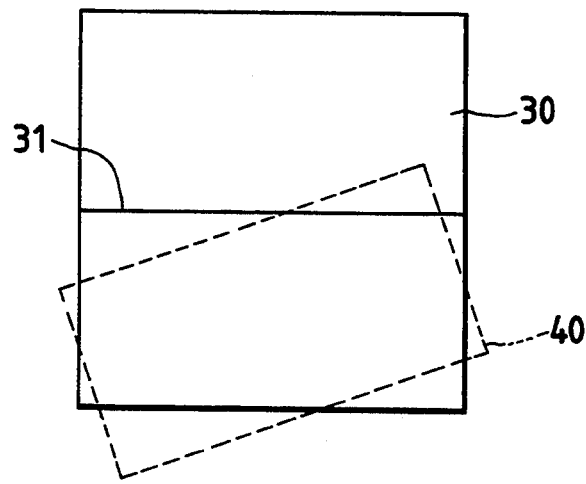
FIG. 18 illustrates a positional relationship between a roof surface and a shield plate.
Figure 19:
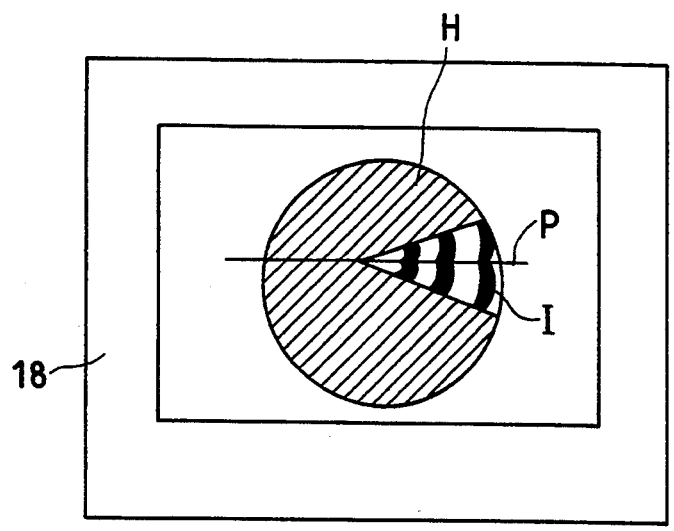
FIG. 19 shows a picture appearing on an observing monitor when the shield plate is inserted in the optical path.
Figure 17:
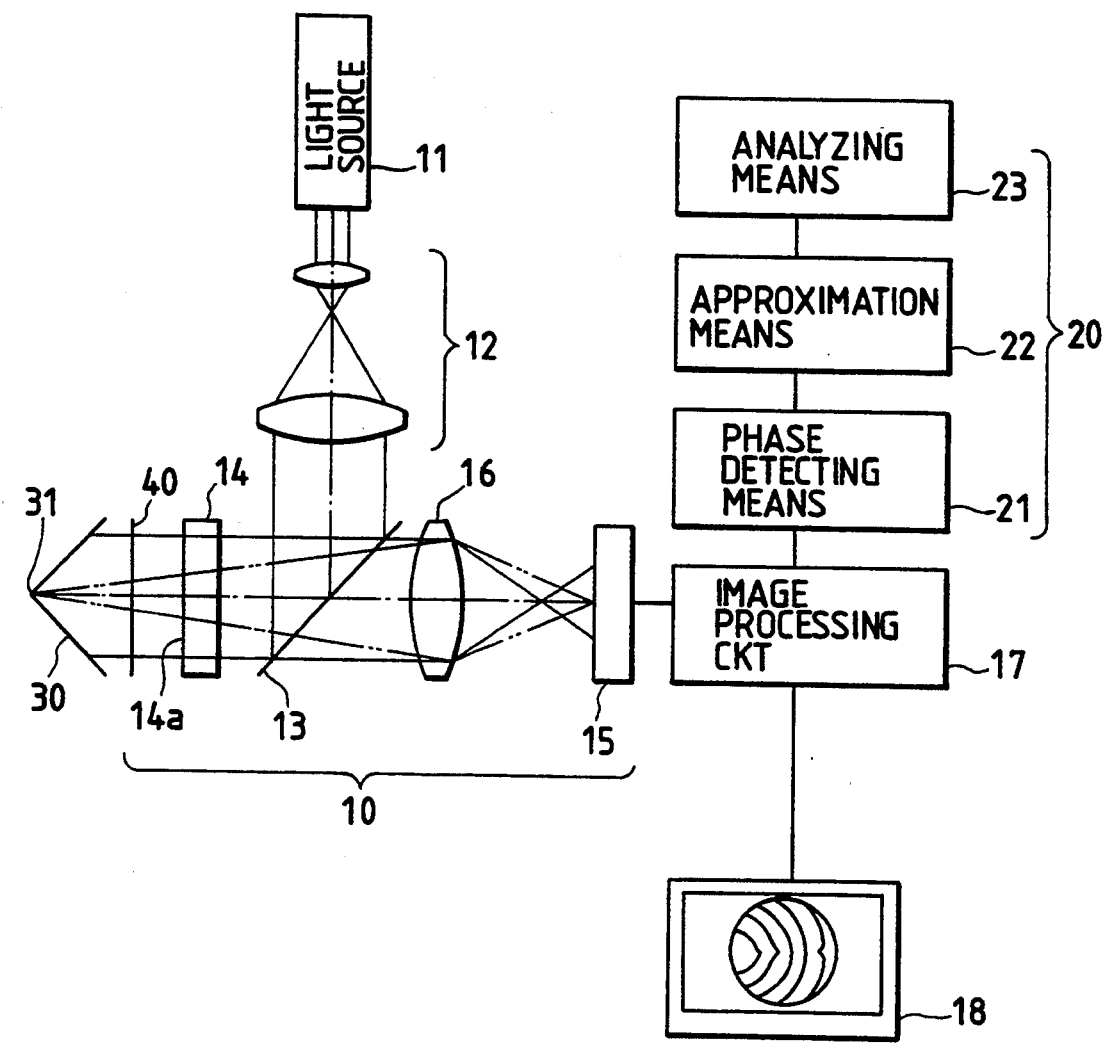
FIG. 17 is a block diagram showing a roof surface measuring apparatus according to a fourth embodiment of the invention.

Referring to FIGS. 17-19, a fourth embodiment of the invention is described.

As shown in FIG. 7, a roof surface measuring apparatus according to the fourth embodiment has basically the same construction as the first embodiment except that a shield plate 40 is dispose between the roof surface 30 and the reference surface 14a.

After processing by the image processing circuit 17, data output from the image detecting element 15 and representing the light an]shade of the detected interference fringe is displayed on the interference observing monitor 18, and also input to the phase detecting means 21, where phase differences at respective unit measuring areas are detected.

At the time of measurement, the optical system is arranged so that the interference fringe produced by the subject beam from the reef surface 30 and the reference beam from the reference surface 14a becomes symmetrical with respect to the line corresponding to the ridge line of the roof surface 30. More specifically, the roof surface 30 is positioned relative to the interferometer 10 in a plane perpendicular to the optical axis of the interferometer 10 and relative to its ridge line (rotational adjustment).

Since the measurement is performed with the ridge line used as a basis, the position of the ridge line should be detected precisely in arranging the optical system.

If the ridge line is not accurate, a discontinuous portion of the interference fringe may be judged to correspond to the ridge line. However, as the ridge line becomes more like a straight line and the bend of the roof surface becomes at a lower degree, it becomes more difficult to detect the ridge line position in the interference fringe. To solve this problem, the shield plate 40 is disposed in the optical path between the roof surface 30 and the reference surface 14a as shown in FIG. 18 so as to obliquely intersect the ridge line 31 of the roof surface 30 mounted on the interferometer 10.

Since the light beam is reflected by the roof surface 30 two times by its two surfaces and returned to the side of the interferometer 10, when the shield plate is inserted its shade appears symmetrically with respect to the line corresponding to the ridge line. FIG. 19 shows an example of a picture appearing on the interference observing monitor 18 when the shield plate 40 is inserted. Although in this example the image processing circuit 17 processes the signal so that an inverted image of the image on the image detecting element 15 appear on the monitor 18, it may be set so that an erect image of the image on the image detecting element 15 appear on the monitor 18. Symbol H in FIG. 19 represents a shade of the shield plate 40, and symbol I represents the interference fringe. A bisector P of an acute angle of the shade H of the shield plate 40 (hatched portion) corresponds to the ridge line.

Although in this example the shield plate is a rectangular plate and is set so that its straight line side intersects the ridge line 31, the shield plate may have such a shape that its curved side intersects the ridge line 31. In this case, the line corresponds to the ridge line can be detected as a line connecting two intersections of the ridge line 31 and the curved side of the shield plate that are determined by moving the shield plate.

While the shade appearing on the monitor 18 is being observed with the shield plate 40 inserted, the roof surface 30 is positioned with respect to the interferometer 10 with the line corresponding to the ridge line used as a reference so that the two surfaces constituting the roof surface 30 form the same angle with the optical axis of the interferometer 10. As a result of this positioning, the interference fringe becomes symmetrical with respect to the line corresponding to the ridge line, and it becomes sufficient to perform the measurement in the measuring area on one side of the line corresponding to the ridge line.

After completion of the above positioning, the measurement of the roof angle and the degree of rounding of the roof surface 30 is performed basically in the same manner as in the third embodiment. Therefore, the description thereof is omitted here.

As described above, according to the fourth embodiment, in arranging the optical system before the actual measurement on the roof surface the ridge line position can be detected precisely by adding a simple means. Therefore, even the roof surface having a highly accurate ridge line can be positioned accurately with respect to the interferometer.

It is noted that the invention can be applied to not only measurements on the roof surface of penta mirrors but also those on the roof surface of glass penta prisms.

What is claimed is:

1. A roof surface measuring apparatus comprising:
   a light source for emitting a coherent light beam;
   a reference surface for reflecting part of the coherent light beam to produce a reference beam;
   means for making part of the coherent light beam incident on a roof surface to produce a subject beam that is reflected from the roof surface;
   an interferometer for causing the reference beam and the subject beam to interfere with each other to produce an interference fringe on a detection plane, and for detecting the interference fringe;
   means for detecting phase differences of the interference fringe in a predetermined measuring area of the detection plane;
   means for determining a continuous approximation function representing a relationship between positions in a first direction perpendicular to a line in the measuring area corresponding to a ridge line of the roof surface and the phase differences detected along the first direction; and
   means for performing an analysis relating to a roof angle of the roof surface based on the approximation function.

2. The roof surface measuring apparatus of claim 1, wherein the analysis performing means determines an error angle on the ridge line by calculating a first-order derivative of the approximation function and substituting a coordinate of the line corresponding to the ridge line into the first-order derivative.

3. The roof surface measuring apparatus of claim 1, wherein the analysis performing means determines an average error angle of the roof surface by substituting coordinates of the line corresponding to the ridge line and an end line of the measuring area.

4. The roof surface measuring apparatus of claim 1, wherein the determining means determines the approximation function without using the detected phase differences of positions on the line corresponding to the ridge line.

5. The roof surface measuring apparatus of claim 1, wherein the detecting means detects the phase differences of the interference fringe in the measuring area except the line corresponding to the ridge line.

6. The roof surface measuring apparatus of claim 1, further comprising mean for averaging the detected phase differences at symmetrical positions with respect to the line corresponding to the ridge line, wherein the determining means determines the approximation function based on the phase differences thus averaged.

7. The roof surface measuring apparatus of claim 6, wherein the analysis performing means determines an error angle on the ridge line by calculating a first-order derivative of the approximation function and substituting a coordinate of the line corresponding to the ridge line into the first-order derivative.

8. The roof surface measuring apparatus of claim 6, wherein the analysis performing means determines an average error angle of the roof surface by substituting coordinates of the line corresponding to the ridge line and an end line of the measuring area.

9. The roof surface measuring apparatus of claim 6, wherein the determining means determines the approximation function without using the detected phase differences of positions on the line corresponding to the ridge line.

10. The roof surface measuring apparatus of claim 6, wherein the detecting means detects the phase differences of the interference fringe in the measuring area except the line corresponding to the ridge line.

11. The roof surface measuring apparatus of claim 1, further comprising at least one polarizer disposed before the detection plane so as to be rotatable about an optical axis of the interferometer to change a contrast of the interference fringe.

12. The roof surface measuring apparatus of claim 11, wherein the roof surface measuring apparatus comprises two polarizers that are independently rotatable.

13. A surface shape measuring apparatus comprising:
a light source for emitting a coherent light beam;
a reference surface for reflecting part of the coherent light beam to produce a reference beam;
means for making part of the coherent light beam incident on a surface to be measured to produce a subject beam that is reflected from the surface to be measured said surface to be measured being different from said reference surface;
an interferometer for causing the reference beam and the subject beam to interfere with each other to produce an interference fringe on a detection plane, and for detecting the interference fringe; and
at least one polarizer disposed before the detection plane so as to be rotatable about an optical axis of the interferometer to change a contrast of the interference fringe.

14. The surface shape measuring apparatus of claim 13, wherein the surface shape measuring apparatus comprises two polarizers that are independently rotatable.

15. The surface shape measuring apparatus of claim 13, further comprising:
means for detecting phase differences of the interference fringe in a predetermined measuring area of the detection plane;
means for determining a continuous approximation function representing a relationship between positions in a first direction perpendicular to a line in the measuring area corresponding to a ridge line of the roof surface and the phase differences detected along the first direction; and
means for performing an analysis relating to a roof angle of the roof surface based on the approximation function.

16. A roof surface measuring method comprising the steps of:
making part of coherent light beam incident on a reference surface to produce a reference beam reflected from if the reference surface;
making part of the coherent light beam incident on a roof surface to produce a subject beam reflected from the roof surface;
causing the reference beam and the subject beam to interfere with each other to produce an interference fringe;
inserting a shield plate in a path of the coherent light beam such that a side of the shield plate intersects a ridge line of the roof surface when viewed along the path of the coherent light beam while observing an image of interference fringe; and
identifying a line corresponding to the ridge line in the image being observed.

17. The roof surface measuring method of claim 16, further comprising the step of positioning the roof surface based on the identified line.

* * * * *